(No Model.)
C. MILLER.
HUB ATTACHING DEVICE.
No. 546,176. Patented Sept. 10, 1895.
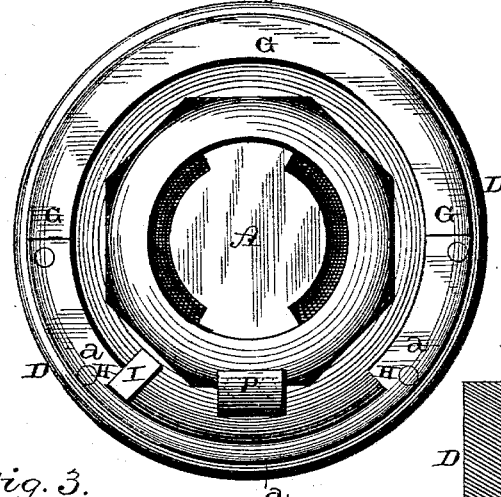
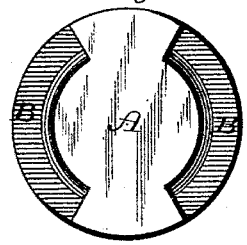
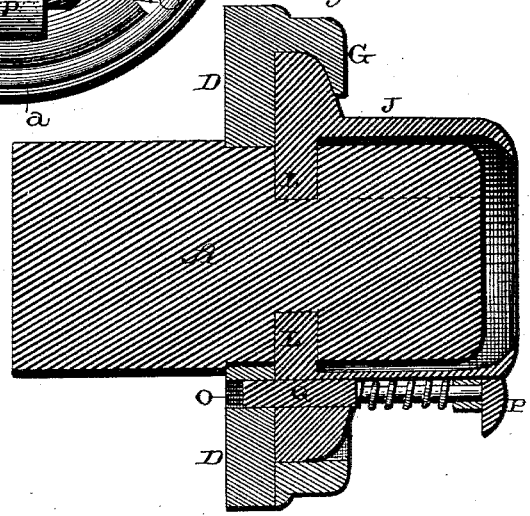
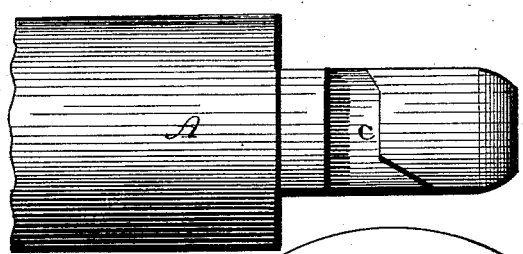
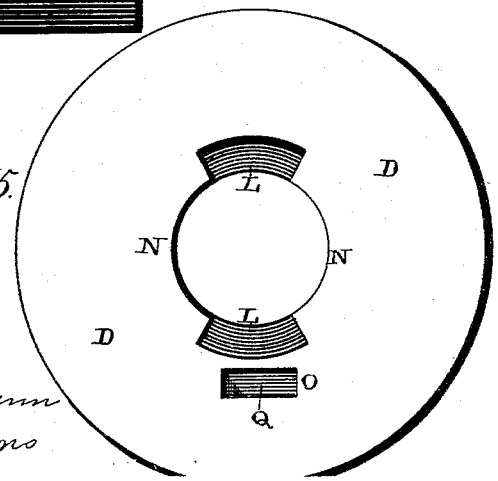
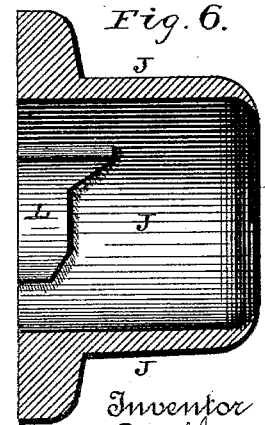
Witnesses
L. F. Lehmann
H. Jenkins
Inventor
Conrad Miller,
per Jno. H. Goodman,
Attorney
ANDREW B.GRAHAM. PHOTO-LITHO. WASHINGTON, D.C.

UNITED STATES PATENT OFFICE.

CONRAD MILLER, OF LEADVILLE, COLORADO.

HUB-ATTACHING DEVICE.

SPECIFICATION forming part of Letters Patent No. 546,176, dated September 10, 1895.

Application filed July 15, 1895. Serial No. 555,960. (No model.)

*To all whom it may concern:*

Be it known that I, CONRAD MILLER, a citizen of the United States, residing at Leadville, in the county of Lake and State of Colorado, have invented certain new and useful Improvements in Axle-Nuts and Hub-Securers or Grooved Safety-Nuts; and I do hereby declare the following to be a full, clear, and exact description of the invention, such as will enable others skilled in the art to which it appertains to make and use the same.

My invention relates to an improvement in axle-nuts and hub-securers; and it consists in the axle having two wide longitudinal grooves in opposite sides and which are connected by transverse grooves combined with a removable stop-plate which fits over the grooved end of the axle and prevents the hub from being displaced, and which is provided with a recessed flange or guide upon its outer side, a rotating nut applied to the outer side of the stop-plate and which is provided with flanges to catch in the grooves, and a spring-catch applied to and moving with the nut and which has its end to catch in a recess in the stop-plate, so as to lock the nut in place, as will be more fully described hereinafter.

The object of my invention is to do away with the screw-threaded nut now used upon axles to hold the hub in place and to substitute therefor a fastening device which has no threads, will not wear out, can be operated entirely by hand, and which is cheap and simple in construction and is easily operated.

In the accompanying drawings, Figure 1 is a front elevation of a mechanism which embodies my invention. Fig. 2 is a longitudinal vertical section of the same. Fig. 3 is an end view of the axle. Fig. 4 is a plan view of the same. Fig. 5 is a side view taken from the inner side of the stop-plate. Fig. 6 is a vertical section of the locking-nut, showing the flanges upon its inner side to engage with the cross-grooves in the end of the axle.

A represents the axle, which has the two wide longitudinal grooves B formed in its outer end and which grooves are connected by the two cross-grooves C, which are made wide at one end and contracted at the other, so as to correspond to the shape of the locking-flanges upon the inner side of the partially-rotating locking-nut.

Placed upon the axle, and bearing against the shoulders formed by the inner ends of the grooves B, is the stop-plate D, which has an opening through it corresponding to the shape of the end of the axle, and which, by fitting against the outer end of the hub, prevents the hub from becoming displaced. Upon the outer side of this stop-plate is formed a suitable semicircular grooved flange G, which catches over the flange upon the inner end of the locking-nut for the purpose of holding the nut in position and at the same time allowing it to partially revolve. The other half $a$, of the semicircular grooved flange G, may be made separate from the plate and from the other half of the grooved flange, or the whole of the grooved flange may be made in a single piece and applied to the outer side of the plate, as may be desired. If this flange is made in two parts, one-half of which is cast with the locking-plate, then it is only necessary to slip the nut inside of the stationary part of the flange and apply the removable half after the nut is in position. In one-half of the flange are formed the two stop-shoulders H, which engage with the movable stop I, secured to the nut and thus regulate the distance that the nut shall turn. The stop-plate and the grooved flanges secured to its outer side have no movement whatever, but the locking-nut J has a partially-turning movement as far as the shoulders and the stop will permit, for the purpose of forcing the locking-flanges L upon the inner side of the nut into the cross-groove C in the end of the axle. When the nut is turned in one direction, these flanges L are moved behind the parts N of the stop-plate, and in which position the flanges pass into the longitudinal grooves B in the end of the axle; but when the nut is turned in the opposite direction these flanges enter the cross-grooves C, and thus lock the stop-plate securely in position. When the locking-flanges L are in the grooves C, they are directly opposite the widest portions of the opening in the stop-plate instead of being behind the narrowest portions N, as when the nut is turned into its other position.

The outer end of the nut projects any suitable distance beyond the grooved flange and slightly beyond the end of the axle, and the outer end of the nut may be either opened or closed, as desired.

In one side of the nut is formed a longitudinal groove in which the spring-actuated locking-bolt Q is placed, and which bolt is adapted to have its inner end catch in an opening O in the locking-plate and thus lock the nut in position to secure the locking-plate in place. When the nut is to be rotated, so as to leave the locking-plate free to be removed, this bolt is drawn back so that its end no longer catches in the hole, and then, as the nut is partially rotated, the inner end of the bolt slides along upon the outer face of the locking-plate. This locking-bolt is provided with a suitable head P, so that it can be operated by the fingers, and hence no wrench or other tool is necessary to unlock the parts. After the bolt has been drawn out to its full length, the locking-plate cannot be removed until the nut has been rotated far enough to bring the stop against the opposite shoulder. The nut must be rotated as far as the stop-shoulders will allow after the bolt has been withdrawn for the purpose of moving the locking-flanges out of the cross-groove C before the stop-plate can be removed. As here shown the axle has only two shoulders; but, if desired, a greater number may be used. All screw-threads are done away with by my invention. All parts can be cheaply constructed by means of a die. There is no danger of the parts becoming loose and the hub coming off, it being impossible to remove this fastening device until the locking-bolt has been operated and then the nut turned its full regulated distance.

This device is adapted for use wherever there is a shoulder for the nut to bear against, and so can be made to hold on other devices besides wheels.

Having thus described my invention, I claim—

The combination of the axle provided with the two wide longitudinal grooves B, and the two cross grooves C, with the locking plate which is placed upon the end of the axle, and provided with the grooved flanges upon its outer side, the flanged partially rotating locking nut provided with flanges upon its inner side, and the spring actuated locking bolt which is adapted to engage with the stop plate, substantially as set forth.

In testimony whereof I affix my signature in presence of two witnesses.

CONRAD MILLER.

Witnesses:
W. W. COOKE,
W. H. HARRISON.